United States Patent
Durfee et al.

(10) Patent No.: US 6,518,917 B1
(45) Date of Patent: Feb. 11, 2003

(54) MPRF INTERPULSE PHASE MODULATION FOR MAXIMIZING DOPPLER CLEAR SPACE

(75) Inventors: Lawrence A. Durfee, Waltham, MA (US); Wesley T. Dull, Chelmsford, MA (US)

(73) Assignee: Raytheon Corporation, Lexington, MA (US)

( * ) Notice: Subject to any disclaimer, the term of this patent is extended or adjusted under 35 U.S.C. 154(b) by 0 days.

(21) Appl. No.: 09/503,931

(22) Filed: Feb. 14, 2000

Related U.S. Application Data (60) Provisional application No. 60/120,541, filed on Feb. 17, 1999.

(51) Int. Cl.[7] .......................... G01S 13/524; G01S 7/282
(52) U.S. Cl. .......................... 342/160; 342/83; 342/159; 342/161; 342/162
(58) Field of Search .......................... 342/81, 83, 159, 342/160, 161, 162

(56) References Cited

U.S. PATENT DOCUMENTS

| | | | |
|---|---|---|---|
| 4,212,012 A | * 7/1980 | Manoogian et al. | 342/91 |
| 4,290,066 A | * 9/1981 | Butler | 342/159 |
| 4,586,044 A | 4/1986 | Hopwood et al. | |
| 4,766,435 A | * 8/1988 | Wells | 342/159 |
| 4,968,967 A | * 11/1990 | Stove | 342/165 |
| 5,345,239 A | 9/1994 | Madni et al. | |
| 5,673,051 A | * 9/1997 | Nussbaum et al. | 342/202 |

* cited by examiner

*Primary Examiner*—Ian J. Lobo
(74) *Attorney, Agent, or Firm*—Daly, Crowley & Mofford, LLP (57) ABSTRACT

A method for operating a radar system includes the steps of overlapping mainlobe clutter interference and feedthrough interference in a Doppler output signal of a coherent pulse Doppler radar including the step of phase modulating each pulse of a transmit signal wherein the selected phase modulation is derived from a linear phase ramp required to shift the mainlobe clutter interference into alignment with the feedthrough interference while being held constant over the duration of a pulse. With such an arrangement, the constant phase shift across each pulse has no effect on the performance of intrapulse compression modulation and results in pulse to pulse phase shifts easily being accomplished with existing phase shifters.

17 Claims, 10 Drawing Sheets

Frequency shifts on the order of MLC width are obtainable with current phase shifter technology in MPRF systems

MPRF INTERPULSE PHASE MODULATION FOR MAXIMIZING DOPPLER CLEAR SPACE

This application claims priority under 35 U.S.C. §119(e) from U.S. provisional application No. 60/120,541 filed on Feb. 17, 1999.

BACKGROUND OF THE INVENTION

The present invention relates generally to radar receivers, and more particularly to a method and apparatus for distinguishing between signals received from a desired target and those received from unwanted clutter.

It is well known that radar operate by transmitting a signal at a radio frequency (hereinafter referred to as the transmitted signal). The transmitted signal is reflected by a target and returned as a received signal. A received signal returned by a target moving radially with respect to the radar transmitter has a frequency different from that of the transmitted signal. The difference between the frequency of the transmitted signal and the received signal, known as the Doppler shift frequency, may be used to determine the range rate between the target and the transmitter. If several targets having different range rates are illuminated by the transmitted signal, the resulting received signals returned by each target are distributed within a band of Doppler shift frequencies. The location of the received signal returned by each target within the Doppler frequency band is thus a function of the range rate of the associated target. If the range rate of a particular desired target is greater (or less) than the range rate of certain other undesired targets, filtering techniques may be used to separate the received signal returned from the particular desired target from the received signals returned from undesired targets.

A problem occurs when the Doppler frequency of a desired target is close to the undesired target's Doppler frequency, either directly or as observed ambiguously with a given waveform. This is particularly troublesome when the undesired targets include ground clutter, as received signals returned from ground clutter are often much more powerful than received signals returned from desired targets. This invention addresses the problem of either acquiring or tracking a low altitude target using a Medium Pulse Repetition Frequency (MPRF) radar on a moving platform, such as an aircraft or missile. The problem faced by such a radar is that when the radar is looking down on the target, mainlobe clutter will always appear in the range, Doppler output of the radar. The mainbeam of the radar's antenna can cover a significant range swath, leaving only the Doppler dimension to resolve the target from mainlobe clutter. If the target is Doppler ambiguous with the Doppler of mainlobe clutter, it will be masked by the clutter, and the radar will be unable to derive useful information from the target signal. Through judicious choice of waveform PRF, the mainlobe clutter blind can be avoided. During track, the radar can resolve the true Doppler of the target and mainlobe clutter, and select PRFs that avoid the clutter blind. During search, multiple PRFs are generally required to uncover the mainlobe clutter blind in each search beam position unless the target Doppler has been accurately designated to the radar.

SUMMARY OF THE INVENTION

With the foregoing background of the invention in mind, it is a general object of the present invention to improve the detectability of small desired targets in the presence of powerful ground clutter in radar systems.

In accordance with the present invention, a method for operating a radar system includes the steps of overlapping mainlobe clutter interference and feedthrough interference in a Doppler output signal of a coherent pulse Doppler radar including the step of phase modulating each pulse of a transmit signal wherein the selected phase modulation is derived from a linear phase ramp required to shift the mainlobe clutter interference into alignment with the feedthrough interference while being held constant over the duration of a pulse. With such an arrangement, the constant phase shift across each pulse has no effect on the performance of intrapulse compression modulation and results in pulse to pulse phase shifts easily being accomplished with existing phase shifters. The technique takes advantage of the phase run out over the duration of a pulse between the applied modulation and linear phase ramp produced by the Doppler shift of the mainlobe clutter signal. The phase run out is a phase ramp with periodicity exactly matching that of the transmitted waveform with the resultant Phase Modulation (PM) line spectrum aliasing at the waveform PRF thus causing mainlobe clutter signal to alias into the feedthrough signal.

BRIEF DESCRIPTION OF THE DRAWINGS

The foregoing and other objects, advantages and novel features of the present invention will become apparent from the following detailed description when considered together with the accompanying drawings, in which:

FIG. 4B shows the error term of the two phase codes of FIG. 4a;

DETAILED DESCRIPTION OF THE PREFERRED EMBODIMENTS

Figure 1:
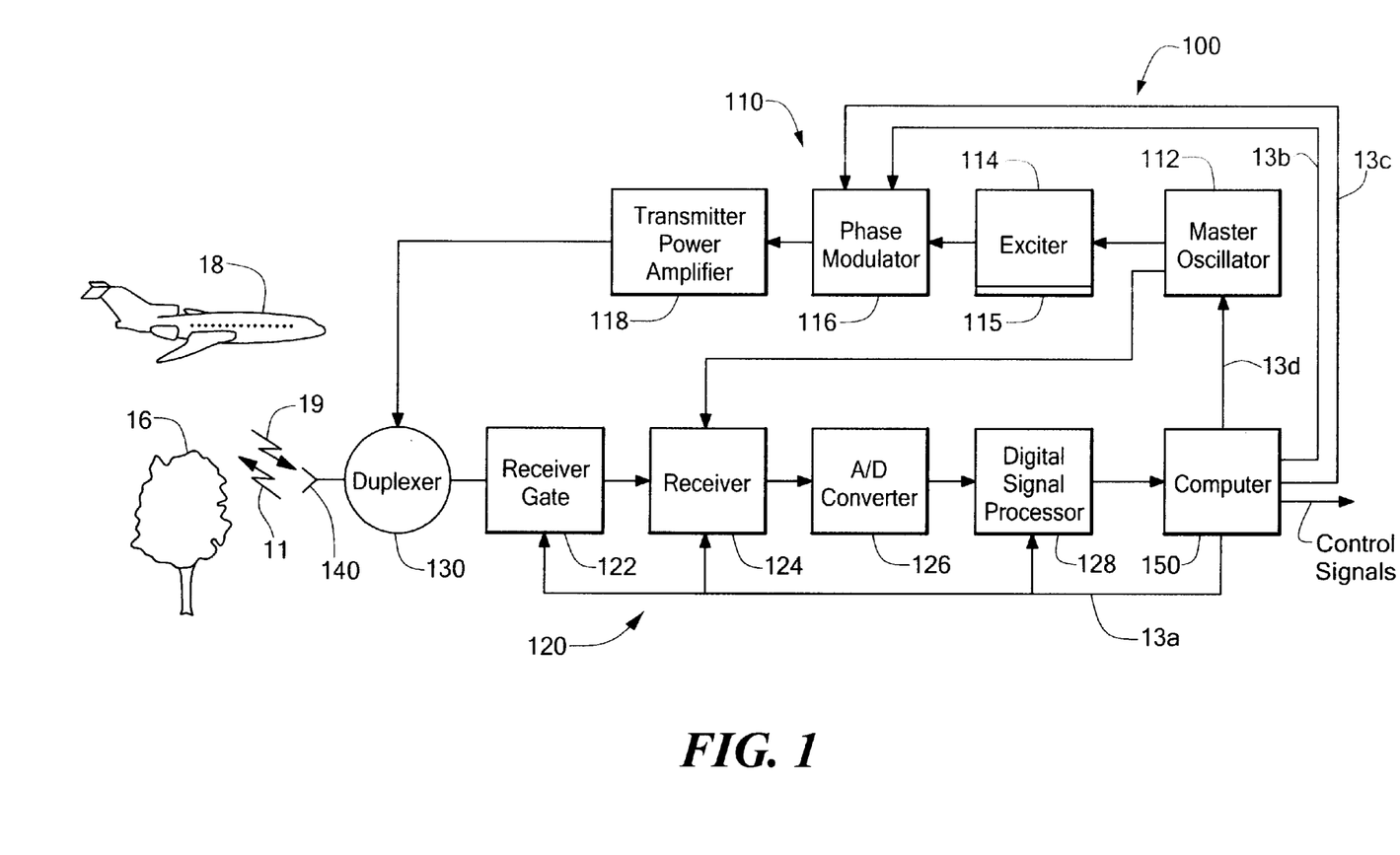
FIG. 1 is a block diagram of a radar system incorporating the present invention.

Referring now to the drawings, in which like reference characters designate like or corresponding parts or signals throughout the several views, there is shown in FIG. 1 a block diagram of a radar system 100 comprising a computer 150, a master oscillator 112, transmitter 110, a receiver 120, a duplexer 130 and an antenna 140. The transmitter 110 includes an exciter 114, a phase modulator 116 and a transmitter power amplifier 118. The receiver 120 includes a receiver gate 122, a receiver 124, analog-to-digital (A/D) converter 126, and a digital signal processor 128. A clutter compensator, according to the present invention, is implemented in the digital signal processor 128, the computer 150, and phase modulator 116. The system of FIG. 1 represents a pulse radar system, although it is to be understood that the present invention may be adapted for use in other systems.

The computer 150 provides reference signals 13a–13d to provide the various components of the radar system the requisite control signals as described hereinafter. In a conventional manner, the master oscillator in response to the computer 150 provides a signal to the exciter 114 which in turns provides an RF signal at the output thereof The phase modulator 116 uses at least one reference signal 13b to provide a phase modulated radio frequency (RF) transmitted signal 11. The transmitted signal 11 is then fed to the transmitter power amplifier 118 where the transmitted signal is amplified, and via duplexer 130, is fed to antenna 140. The antenna 140 can scan a designated search volume by either mechanical or electronic means. As antenna 140 scans a designated search volume, a received signal 19 is reflected by objects within the operating range of the radar system 100, the objects including, for example, both a desired moving target 18 shown as an aircraft and undesired ground clutter 16 such as trees or other stationary objects. Received signal, 19 is then received by antenna 140. In conventional fashion, received signal 19 is fed from the antenna 140, via duplexer 130, to the receiver gate 122 and the receiver 124 which in turn heterodynes the received signal with a signal from the master oscillator 112 to produce a baseband signal. The baseband signal is fed to the A/D converter 126 in turn produces discrete time samples of the baseband signal, as a sampled baseband signal which is fed to the digital signal processor 128. In accordance with the present invention, the digital signal processor 128 then performs additional analysis such as a discrete Fourier transform to determine Doppler frequencies and other information of interest in a manner as described hereinafter. The latter is then fed to the computer 150 to provide control signals to control a vehicle as well as the various components of the radar system 110. It is to be understood that while digital signal processor 128 and computer 150 are shown separately, a single computer may be alternatively used or a combination of multiple computers and digital signal processors may be used.

Figure 2A:
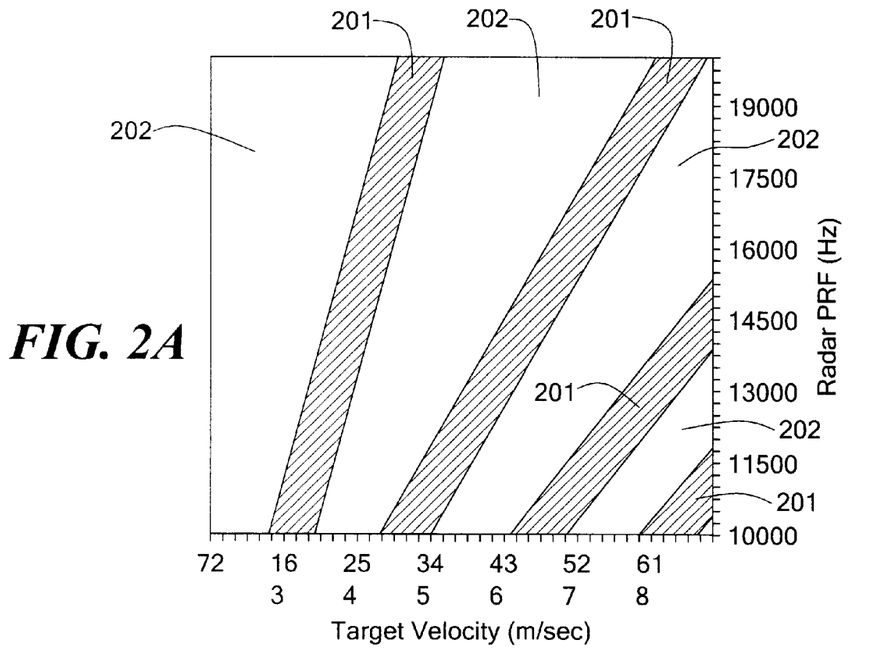
FIG. 2A shows the clutter zones for a representative encounter where the radar is searching for a target that can have any velocity between 72 and 679 m/sec.

Before departing on a detail description of the invention, it may be helpful to review the state of the art. FIG. 2A shows the clutter zones 201 for a representative encounter where the radar 100 is searching for a target that can have any velocity between 72 and 679 m/sec (representative velocity range for the MiG-29Fulcrum, as listed in the 1997–98 version of Jane's "All the World's Aircraft", page 403), and for a typical X Band radar system operating in the MPRF mode with PRFs in the range of 10 to 20 kHz (D. Curtis Schleher, "MTI and Pulse Doppler Radar", pp.59 & 60). As the figure shows, it is possible to find a pair of PRFs that together have no overlapping blinds over the range of possible target Dopplers (in the example of FIG. 2A, 11 kHz and 14.5 kHz have no overlapping clutter blinds for all possible target velocities). These are referred to as complementary PRFs.

Figure 2B:
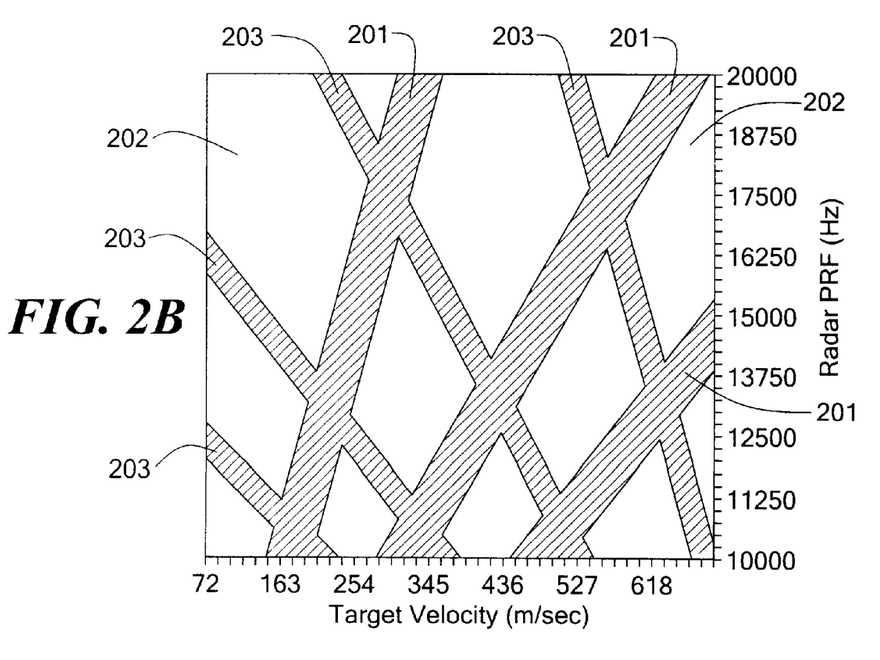
FIG. 2B illustrates the PRF blind zones that can result from both feedthrough and main lobe clutter (MLC) taken together.

If the main lobe clutter (MLC) signal is the only interference that must be avoided, PRF combinations can generally be found that have no overlapping blinds within the range of possible target Dopplers. Unfortunately, however, mainlobe clutter is not the only consideration. In addition to mainlobe clutter, eclipsing within the target search volume must be avoided, range ambiguous altitude return must be avoided, and feedthrough that finds its way into the processor output must also be avoided. Feedthrough can result from a number of sources that find their way into the receiver chain before the A/D converter, such as the switching power supply used to generate the high voltages required for the transmitter (if a tube design is used), system clock feedthrough or DC offsets generated by the A/D converter. It is therefore highly desirable to maximize the available clear space considering clutter and feedthrough so that there is maximum PRF "flexibility" for avoidance of altitude return and waveform eclipsing. FIG. 2B illustrates the PRF blind zones that can result from both feedthrough and MLC taken together; as examination of the figure shows, the feedthrough adds additional blinds zones 203 intersecting at angles to those of mainlobe clutter (a 43% increase in blind zones over FIG. 2A), significantly reducing the available clear space 202. It should be appreciated that it can become difficult, if not impractical in some situations, to find combinations of PRFs (complementary pairs) that simultaneously satisfy the four constraints for target visibility: avoidance of altitude return, waveform eclipsing, feedthrough blinds, and MLC blinds (this is especially true during search in situations where the radar has poor apriori knowledge of the target's Doppler).

Feedthrough is generally easy to control in that it is a relatively simple matter to cause feedthrough from all sources to occupy the zero frequency bin (and several of its neighbors due to spillover) in the range Doppler output of the radar. DC feedthrough falls in the zero frequency bin, and feedthrough from clocks and the transmitter switching supply can be made to alias into the zero frequency bin by constraining the clocks and power supply switching frequencies to be integer multiples of the waveform PRF.

The problem, then, that this present technique addresses is controlling the position of mainlobe clutter in the radar's range Doppler output. Specifically, the technique uses interpulse phase modulation of the transmit signal that causes the mainlobe clutter blinds to align with feedthrough blinds in the range Doppler output of the radar, thus maximizing the available clear space. The phase modulation can be implemented with digital phase shifters 115 used for impressing pulse compression modulation on the exciter signal in the exciter 114. The phase modulation is held constant over the duration of a pulse (i.e., the modulation is interpulse phase modulation) and therefore produces absolutely no degradation in the performance of any intrapulse pulse compression modulation. Although the primary benefit of the technique is realized during search, a secondary benefit is realized during track in that maximum PRF availability is realized for avoidance of altitude return and waveform eclipsing. It should be appreciated that with the interpulse nature of the modulation, this feature makes the required pulse to pulse phase shift relatively large, thus producing a modulation that can be implemented with existing digital phase shifters.

As stated, the invention addresses the above problem by placing an interpulse phase modulation on the transmitted signal which causes the mainlobe clutter blinds to align with those of feedthrough. PRF selection is simplified and made more effective when feedthrough and clutter blinds can be made to align in Doppler.

The technique has potential application in any airborne MPRF radar application where there is a strong mainlobe clutter return. Possible applications are surveillance modes of avionics radars which use MPRF waveforms, terminal active missile seeker acquisition with MPRF waveforms, and MPRF track of low altitude targets by either avionics or missile seeker radars. In all of the above situations, there is potential for strong mainlobe clutter return, if the final spectral position of this return is not controlled, it adversely impacts the radar's ability to place the target in Doppler clear space free from altitude return, feedthrough, eclipsing, and mainlobe clutter. The technique causes feedthrough and mainlobe clutter to overlap in the final spectral output of the radar, thus isolating two of the major sources of interference to the same spectral region of the radar's output.

It should be noted that the phase shifter state must be returned to a fixed (not advancing) state during pulse off time to prevent "feedthrough frequency shift".

Figures 3A, 3B:
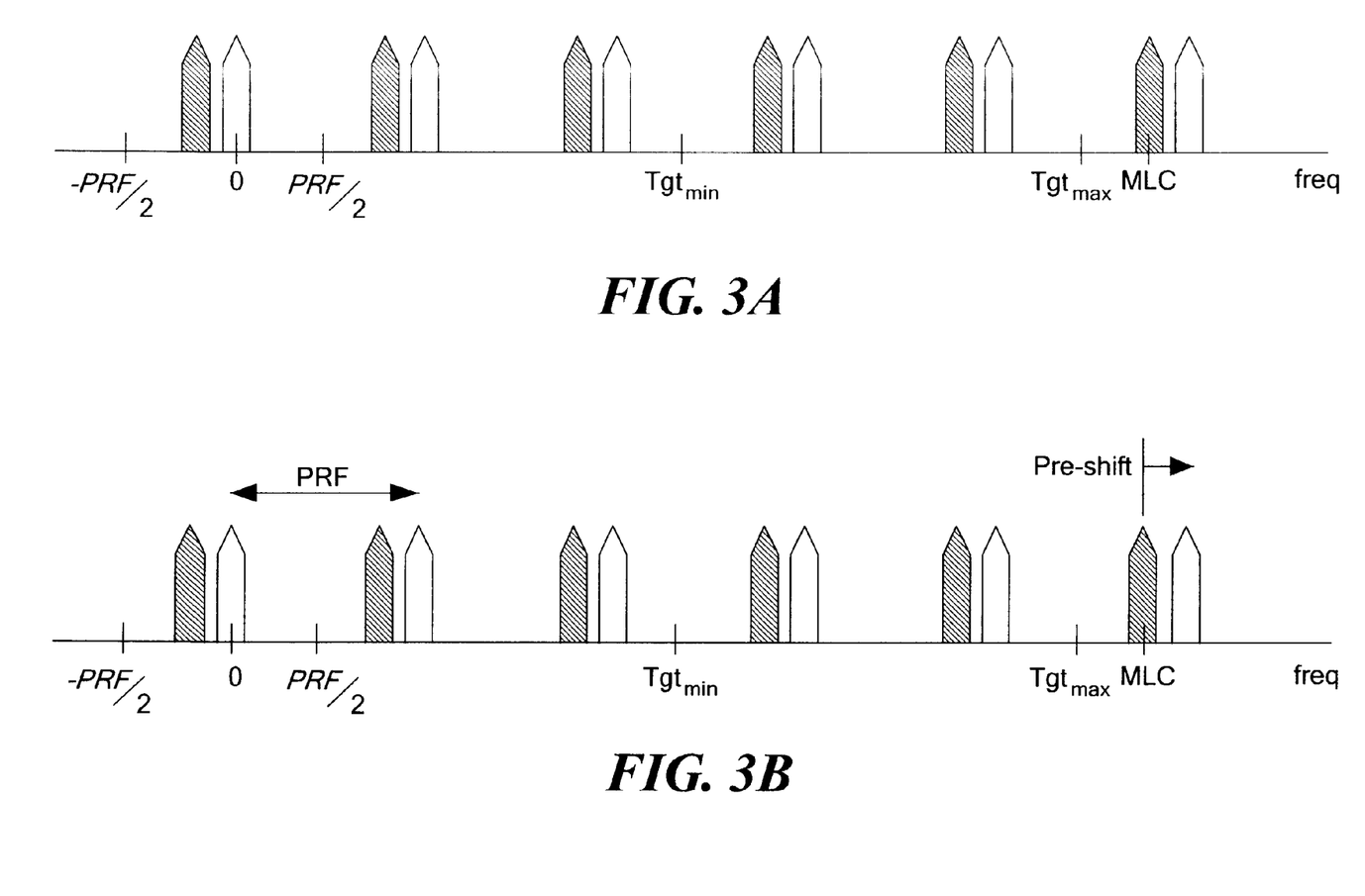
FIG. 3A shows the spectral ambiguities for both feedthrough and clutter in a tail chase encounter.
FIG. 3B shows that if the transmit signal is "pre-shifted" in frequency a slight amount, the mainlobe clutter return signal will be in alignment with the Doppler ambiguities of feedthrough.

The final Doppler output of a pulse Doppler radar covers frequencies from –PRF/2 to PRF/2, where PRF is the Pulse Repetition Frequency of the radar's waveform. All other frequencies in the processed return outside of this range alias into this fundamental spectrum, and this fundamental spectrum is the basic Doppler ambiguity of the waveform used by the radar. For Medium PRF waveforms, which are the application for this invention, the signals of interest to the radar have Doppler shifts which exceed the fundamental waveform ambiguity. The position of any particular signal in the final spectral output of the radar can be found by subtracting integer multiples of the waveform PRF until the signal folds into the fundamental waveform ambiguity. An example is illustrated in FIG. 3A, which shows the spectral ambiguities for both feedthrough and clutter in a tail chase encounter. Note that in the example of FIG. 3A, the range of possible target Dopplers cover several waveform ambiguities. Target Dopplers that are coincident with the blinds from feedthrough or clutter will fold into the same spectral position as the interference in the radar's Doppler output, and thus will be masked by the interference. To unmask the interference blinds within the range of possible target Dopplers during search, a second PRF must be selected that has no overlapping blinds with those of the first PRF within the target Doppler zone of interest. The set of PRFs which satisfy the above constraints can quickly become a small set, especially when the added constraints of avoiding eclipsing and altitude return are included. The motivation for this invention is therefore to find a way of causing the interference blinds from the clutter and feedthrough to overlap for any selected PRF, thereby maximizing the clear space within the target Doppler zone.

One aspect of the invention is the realization that mainlobe clutter and feedthrough interference can be made to overlap in the final Doppler output of a coherent pulse Doppler radar by placing interpulse phase modulation on the transmit signal. The selected phase modulation is derived from the linear phase ramp required to shift the mainlobe clutter spectrum into alignment with feedthrough, but is held constant over the duration of a pulse. This constant phase shift across each pulse therefore has no effect on the performance of intrapulse pulse compression modulation, and results in pulse to pulse phase shifts easily implemented with existing phase shifters. The technique takes advantage of the phase run out over the duration of a pulse between the applied modulation and the linear phase ramp produced by the Doppler shift of mainlobe clutter. The phase run out is a phase ramp with periodicity exactly matching that of the transmitted waveform; the resultant PM line spectrum aliases at the waveform PRF thus causing mainlobe clutter to alias into feedthrough.

In its simplest form, the fundamental idea is to pre-shift the center frequency of the transmit signal each coherent dwell to bring the mainlobe clutter PRF lines into alignment with the feedthrough (which appears at zero Doppler). The basic idea is illustrated in FIG. 3B, which shows that if the transmit signal is "pre-shifted" in frequency a slight amount, the mainlobe clutter return signal will be in alignment with the Doppler ambiguities of feedthrough. The amount of frequency shift is determined by the estimation of the location of MLC as described hereinafter. It also should be noted, that the target Doppler will be shifted by the same amount but this can be compensated for in the digital signal processor 128.

The basic idea, then, is to slightly shift the frequency of the transmit signal to bring the feedthrough and the mainlobe clutter blinds into alignment. A constant frequency shift corresponds to a linear phase shift over time. If a linear phase shift whose slope equals the desired frequency offset is impressed on the transmit signal over the course of a dwell, the required frequency shift would be achieved. Approximating the ideal phase shift by switching the phase states of a digital phase shifter each clock count (where the clock frequency is the A/D sample rate in the radar receiver), however, is not necessarily practical. Consider the following illustration: a Catalina Research, Inc. Nimble Analog to Digital Converter Board User's Guide lists the board's capabilities as 10 to 16 bits, at 5 to 60 MSPS. A 60 MHz sample rate is a 16.7 nsec clock. If the desired Doppler shift is 25 kHz (corresponding to 375 m/s at X Band, the middle of the,MiG-29 velocity range reported in Jane's), then the required increment between phase states is $2 \times \pi \times 25,000 \times 16.7 \times 10^9 = 2.6 \times 10^{-3}$ radians (0.15 degrees).

Although achieving the small phase shift required to generate the linear phase ramp between clock counts is not practical, achieving the required phase shift between transmit pulses is reasonable. Consider the phase shift required for the above example considering a waveform PRF of 20 kHz. The phase shift is $(2\pi)25,000/20,000=2.5\pi$ radians (450 degrees, or 90 degrees modulo 360 degrees), which is easily realizable with current technology. By shifting the phase between pulses and holding it constant over the duration of the pulse, the return signal has a phase error over the duration of the pulse which is the difference between the ideal phase ramp, and the constant phase shift actually applied. This phase error is a periodic sawtooth waveform having periodicity which exactly matches that of the transmit PRF. It represents Phase Modulation (PM) on the return signal. This PM produces a line spectrum with line spacing exactly equal to that of the transmit PRF. The required frequency shift has been achieved, and the spectral lines produced by the phase run out over the duration of the pulse all fold at the waveform Doppler ambiguity, causing the feedthrough and mainlobe clutter blinds to overlap. Having described the general concept of the invention, we will now embark in describing the invention in greater detail, and also addresses secondary issues of determining how much frequency shift is required, and how to best approximate that shift considering the quantization levels of practical phase shifters.

With this proper choice of a constant phase shift for each transmit pulse, the returning MLC signal as well as the target signal will be a phase modulated (PM) signal having a shifted carrier frequency with spectral lines precisely separated by the waveform PRF. The goal in the choice of phase shift applied to each pulse over a Coherent Processing Interval (CPI) is to translate the carrier frequency by an amount that will cause the MLC return signal to be a multiple of the PRF. This fold will cause MLC signal to fold on top of the feedthrough signal in the digital processor.

A signal may be shifted in frequency by applying a linear phase shift across the waveform. This is shown below, translating x(t) from $f_c$ Hz to ($f_c$+a) Hz by applying the linear phase shift $\phi(t)$ to the signal.

Figure 4A:
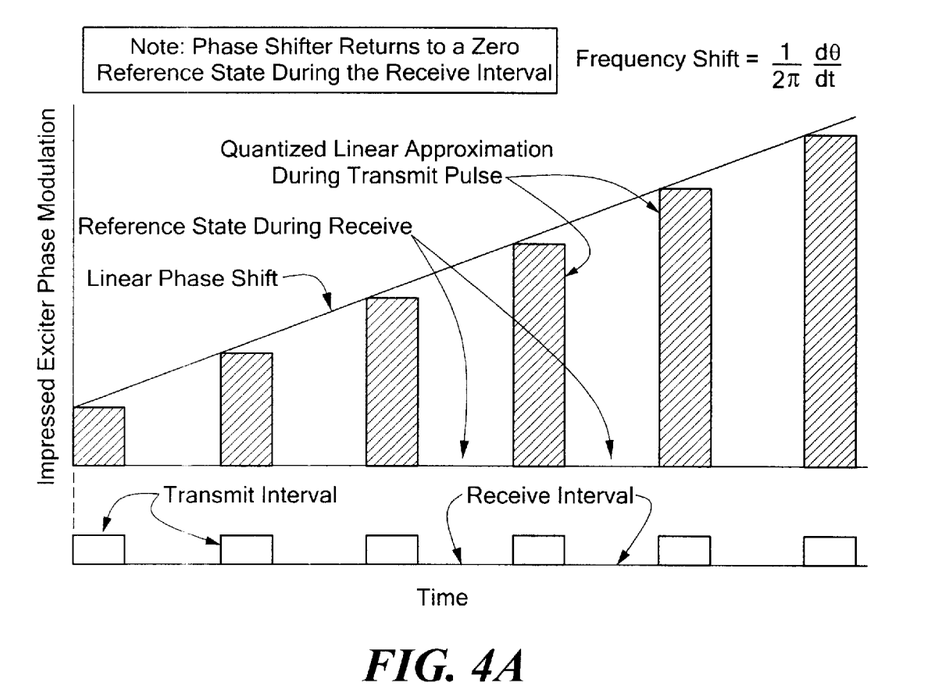
FIG. 4A is a plot of the discrete interpulse phase code and the linear phase code from which it is derived as a function of time and the pulsed envelope of the transmit signal.

Let: $x(t) = g(t) * e^{j(2\pi f_c t + \phi(t))}$ $\phi(t) = 2\pi g * t$ $\theta(t) = 2\pi f_c t + \phi(t)$ Then: $x(t) = g(t) * e^{j(2\pi f_c t + \phi(t))} = g(t) * e^{j(2\pi f_c t + 2\pi g * t)} = g(t) * e^{j(2\pi (f_c + a) * t)}$ $f_i = (1/2\pi) * d\theta/dt = f_c + a$ where:

g(t)=time gating function $f_c$=carrier frequency $\phi(t)$=applied linear phase shift $\theta(t)$=insantatenous angle of the signal; and $f_i$=instantaneous frequency of the signal The inventive concept applies a quantized linear phase code to the waveform over a Coherent Processing Interval (CPI) to accomplish the same frequency translation. The quantized linear phase code approximates a linear phase code from transmit pulse to transmit pulse but is constant over any one pulse. FIG. 4A is a plot of these two phase codes as a function of time. Also shown in FIG. 4A is the pulsed envelope of the transmit signal.

Figure 4B:
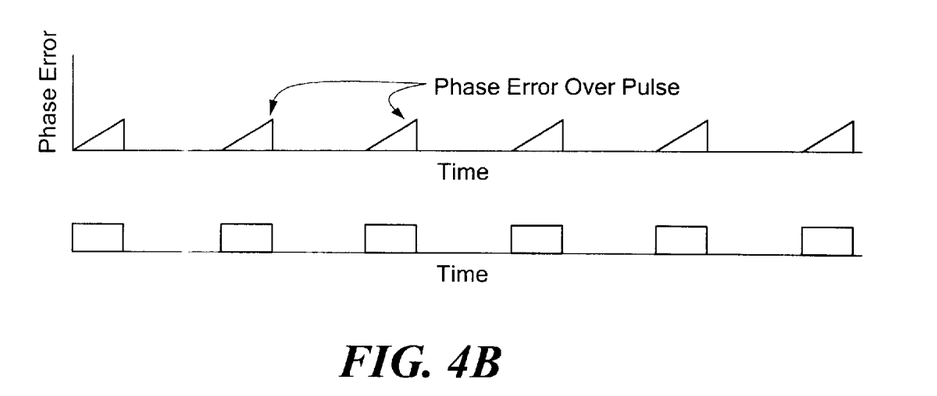

An ideal linear phase code and an error term can approximate the quantized linear phase code. The ideal code is shown in FIG. 4A while the error term is shown in FIG. 4B. The signal can then be described as the sum of phase terms.

Figure 5:
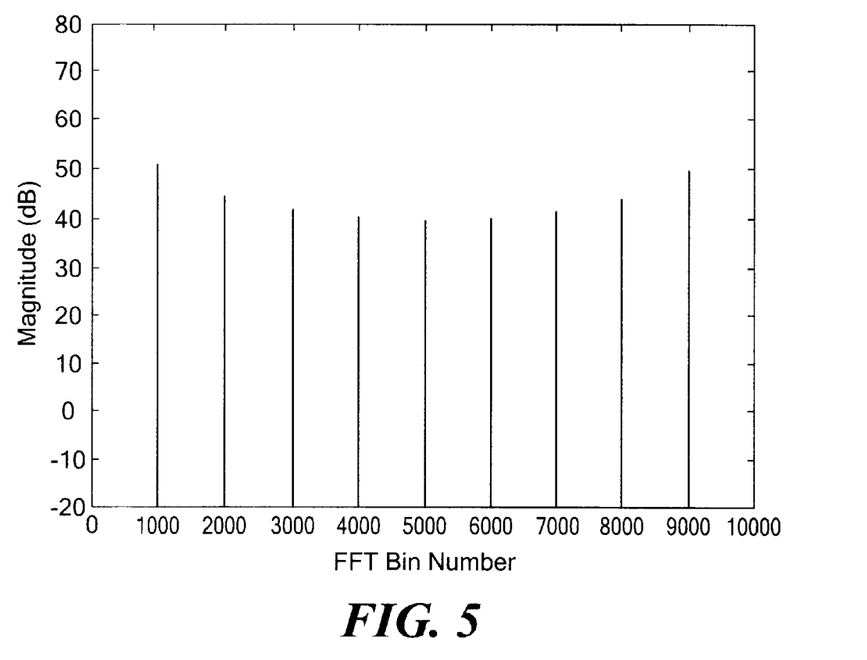
FIG. 5 is a spectrum of a continuous sinusoid with a periodic sawtooth phase modulation.
Figure 6:
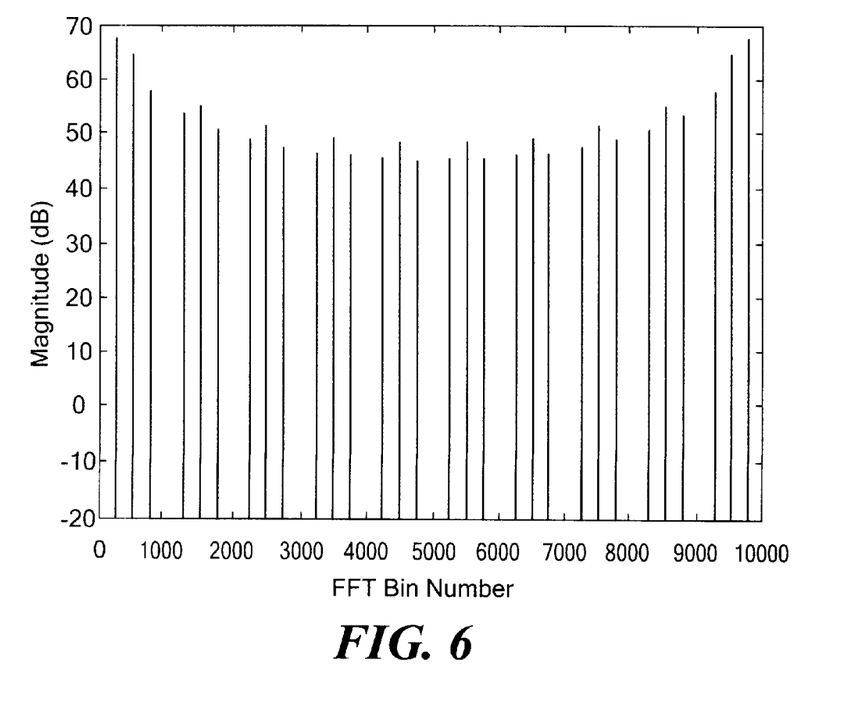
FIG. 6 is a spectrum of a pulsed sinusoid with no phase modulation.
Figure 7:
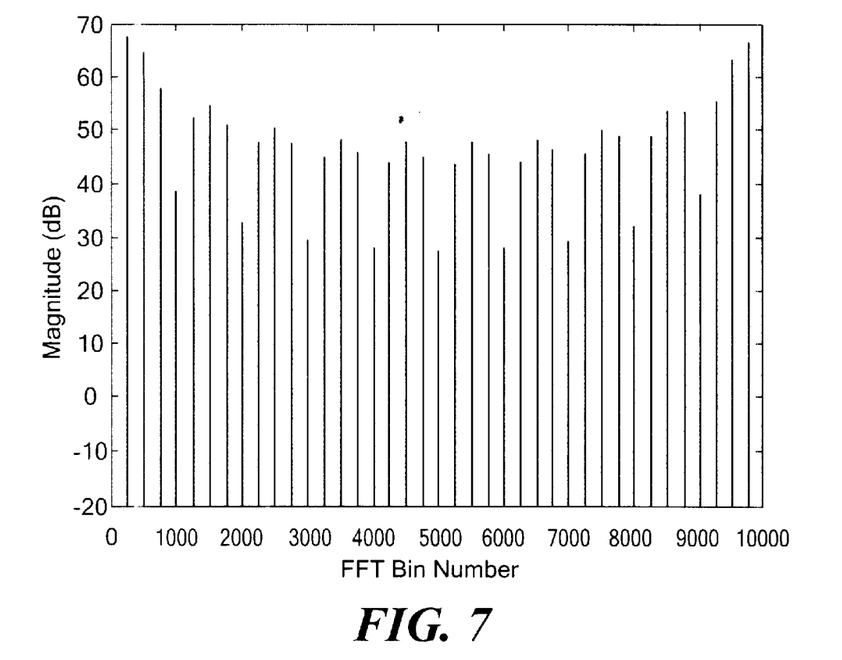
FIG. 7 is a spectrum of a pulsed sinusoid with a periodic sawtooth phase modulation.
Figure 8A:
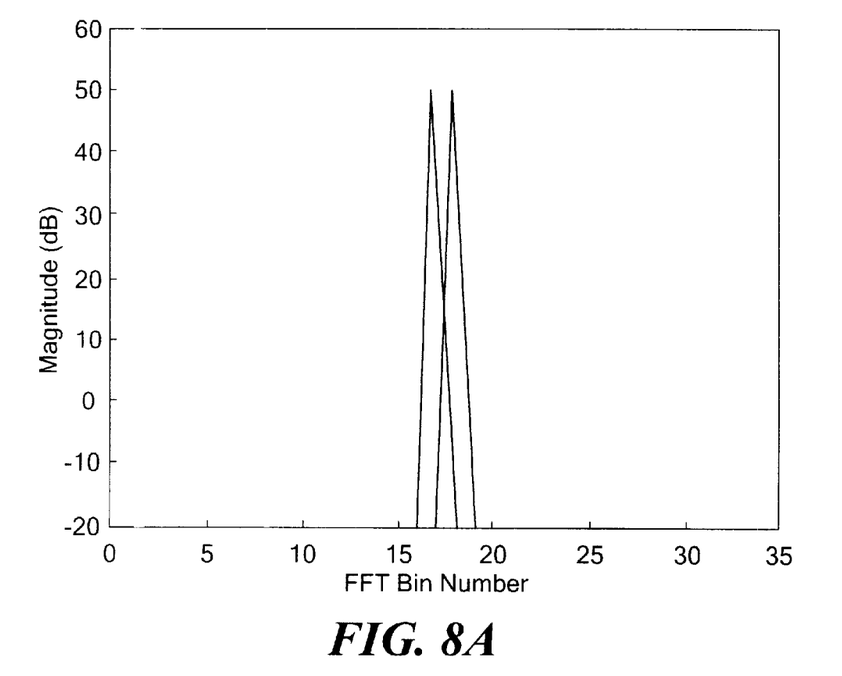
FIG. 8A shows two superimposed frequency domain plots of a detected signal, one with the quantized linear phase code modulation applied, and the other without.
Figure 8B:
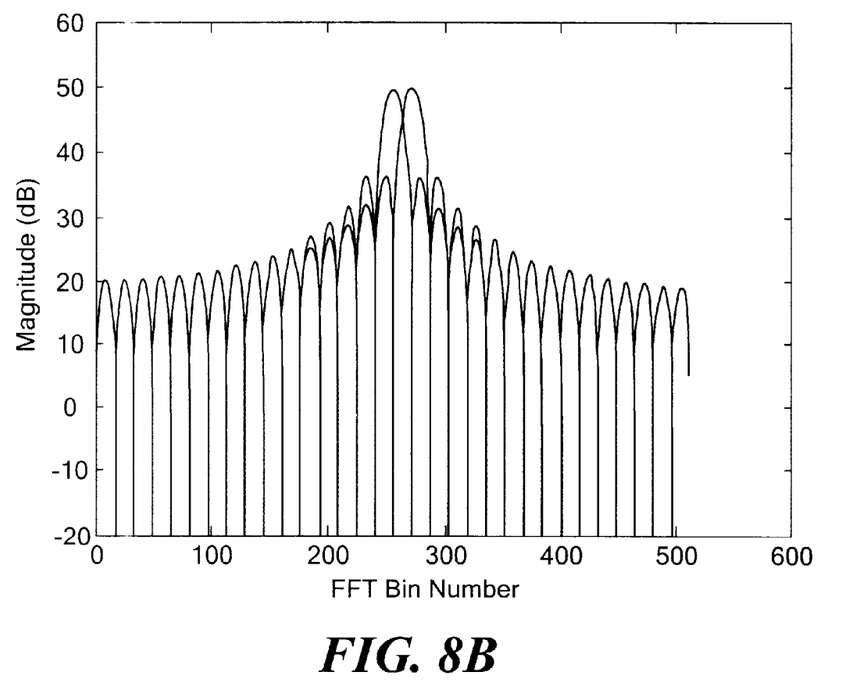
FIG. 8B is the same data processed in a 512 Pt FFT (zero padded) in order to see the filter sidelobe structure.

$x(t) = g(t) * e^{j(2\pi f_c t + \phi_q(t))} = g(t) * e^{j(2\pi f_c t + \phi_i(t) - \phi_e(t))} = g(t) * e^{j(2\pi (f_c + f_s) * t - \phi_e(t))} = g(t) * e^{j(2\pi f_{mod} * t - \phi_e(t))}$ where:

g(t)=time gating function $f_c$=is the unmodulated carrier frequency $f_s$=desired frequency shift $f_{mod}$=is the modulated carrier frequency $\phi_q(t)$=quantized phase code $\phi_i(t)$=ideal phase code $\phi_e(t)$=difference between ideal phase code and quantized phase code The signal x(t) has its carrier frequency fc translated by the desired frequency shift $f_s$ Hz to the modulated carrier frequency $f_{mod}$ Hz. In addition to the shifted central line the signal contains harmonic spectral lines spaced at multiples of the PRF due to the periodic modulation (pulsed waveform with sawtooth phase error term). This is outlined in Carlson, chapter 6.2 of "Communication Systems", 1975 and Panter, chapter 7 of "Modulation, Noise and Spectral Analysis," 1965. FIGS. 5, 6 and 7 illustrate the above point. FIG. 5 is a spectrum of a continuous sinusoid with a periodic sawtooth phase modulation. FIG. 6 is a spectrum of a pulsed sinusoid with no phase modulation and finally, FIG. 7 is a spectrum of a pulsed sinusoid with a periodic sawtooth phase modulation. In a matched filter receiver these harmonic lines will fold on top of each other. This is illustrated in FIGS. 8A and 8B. FIG. 8A shows two superimposed frequency domain plots of a detected signal. The signal consists of 32 coherent pulses processed with a 32 point FFT. The first is a plot of an unmodulated signal centered in the FFT. The second is the same signal shifted one bin using a quantized linear phase code. As can be seen both plots are identical except for the frequency shift. FIG. 8B is the same data processed in a 512 point FFT (zero padded) in order to see the filter sidelobe structure. Again, both of these plots are identical except for the frequency shift.

The minimum frequency shift, $f_{min}$, achievable by a system is a function of two parameters, the number of bits in the phase shifter and the PRF. This minimum shift is given by:

$f_{min} = PRF/(2^n)$ where:

n=number of bits in the phase shifter

PRF=Pulse Repetition Frequency; and $f_{min}$=minimum frequency shift

In addition, frequency shifts greater than $f_{min}$ are quantized to $f_{min}$.

Figure 9:
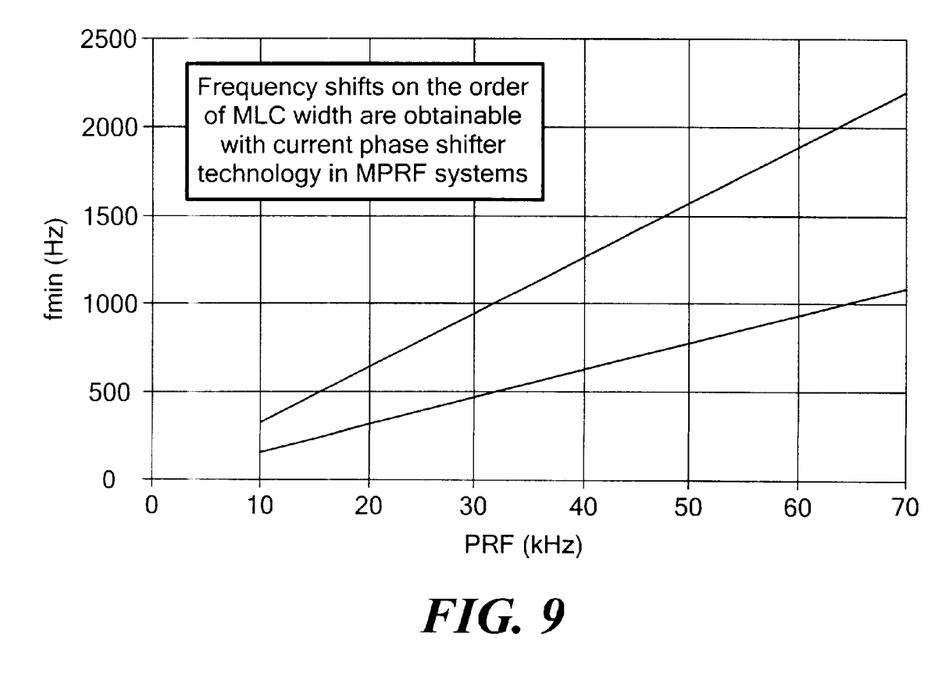
FIG. 9 is a plot of $f_{min}$ as a function of PRF for two different phase shifter resolutions, one at 5 bits and one at 6 bits.

FIG. 9 is a plot of $f_{min}$ as a function of PRF for two different phase shifter resolutions: 5 and 6 bits (M. Skolnik, "Radar Handbook", Second Edition 1990, section 7.9). A typical. X Band system operating in the MPRF mode may have PRFs in the range of 10 to 20 kHz (D. Curtis Schleher, "MTI & Pulse Doppler Radar", pages 59 & 60). FIG. 9 shows PRFs in the range of 10 to 70 kHz. This was done to include Ka Band systems with the same unambiguous velocity coverage in the performance comparisons. For these PRFs, FIG. 9 shows minimum frequency shifts: of less than 500 Hz, in fact shifts less than 1 KHz are obtainable for PRFs up to 60 kHz with a 6 bit phase shifter.

To determine the required phase modulation or frequency shift to place the MLC signal at a multiple of the PRF, the frequency of the mainlobe clutter must be known or estimated. This can be done by actively tracking mainlobe clutter during the acquisition process and modifying the clutter estimate based on IMU and head position data. Alternatively, if a high degree of accuracy is not required the mainlobe clutter frequency can be estimated from IMU and head position data alone depending upon system resolution requirements.

A block diagram of a radar system 100 incorporating the frequency shift concept is shown in FIG. 1. It is important to note that implementation of this technique does not preclude the use of pulse compression phase codes. The phase code impressed on the pulse would simply be the sum of the pulse compression modulation and the clutter offset (linear phase) modulation. In fact, it is because of the use of pulse compression modulation phase codes in MPRF systems that makes this technique attractive. This is because the required hardware is already in place and only a minimum amount of software need be added, such as a clutter track algorithm and a frequency shift algorithm.

Next, we will consider three areas of error using the clutter offset technique. The first is the errors due to a non-ideal phase shifter. The second is the error in the knowledge of MLC. The third is error in positioning MLC over feedthrough.

Above, we described the frequency shifting or clutter offset mechanism under the ideal condition of no phase shifter errors. In this case, there were no frequency sidelobes generated to spread MLC. But unfortunately, this is not the case in an actual implementation. Phase shifter errors do exist and they will spread the MLC signal. The goal is to reduce the MLC spread into other Doppler filters to below that of the sidelobe clutter signal. The requirement for MLC rejection will vary from system to system depending upon the clutter environment, antenna pattern (mainlobe and sidelobe levels), missile trajectory as well as acquisition and track waveforms used. With this in mind, MLC spreading due to phase shifter errors must be considered with other system phenomena, like oscillator stability, timing jitter, Doppler weighting, etc., that tend to spread clutter. This is in order to develop a set of balanced system requirements.

Figure 10:
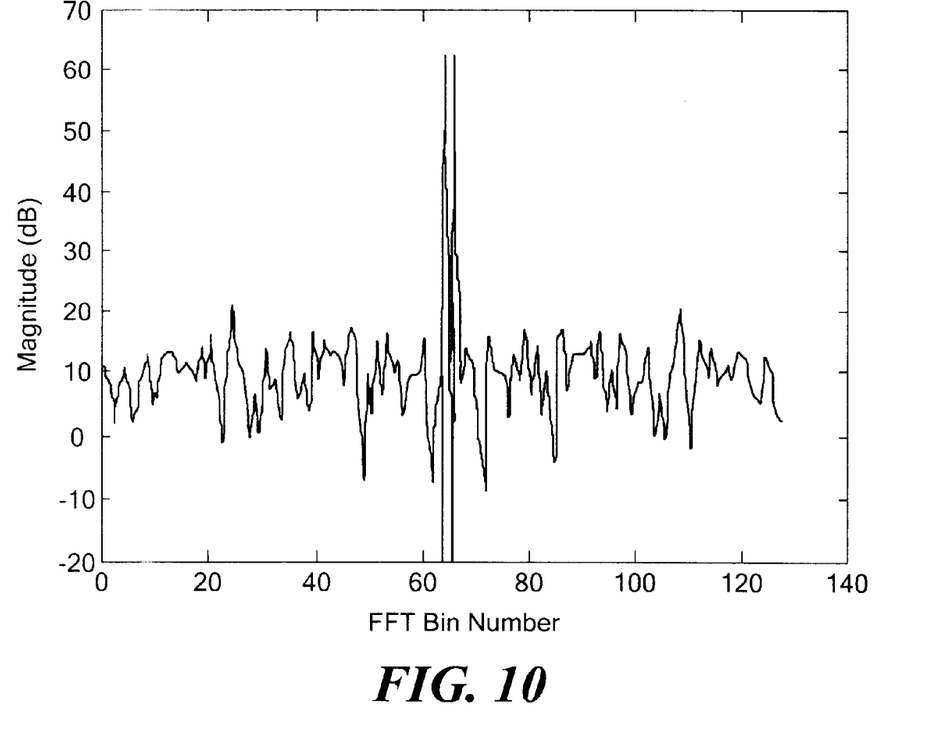
FIG. 10 is a comparison of an unshifted pulse Doppler signal and a shifted pulse Doppler signal (shifted 2 bins) using a 6 bit phase shifter with a 2 degree rms error.

FIG. 10 is a comparison of an unshifted pulse Doppler signal and a shifted pulse Doppler signal (shifted 2 bins) using a 6 bit phase shifter with a 2 degree rms error. From FIG. 10 it can be seen that for the shifted signal the peak sidelobes are down greater than 40 dB.

Figure 11:
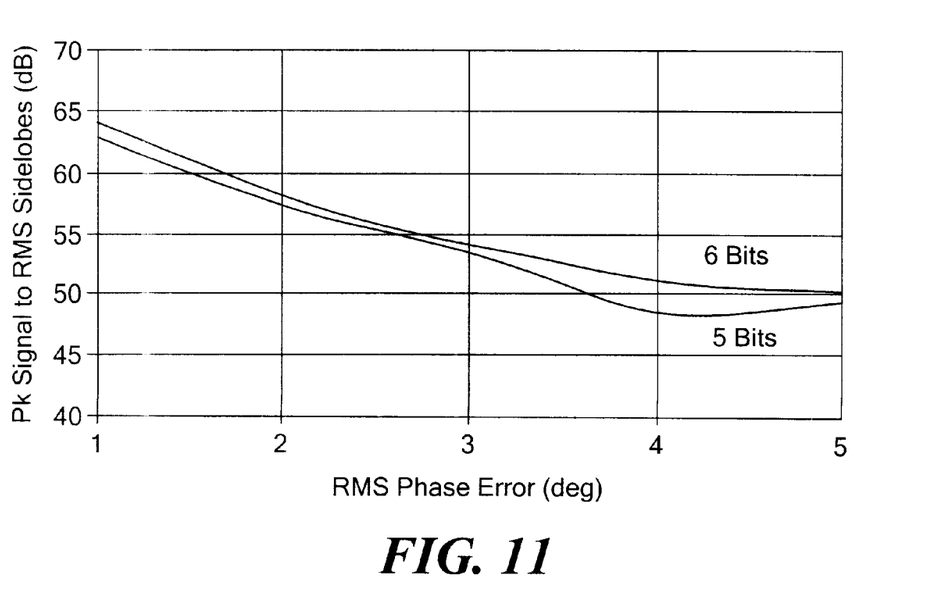
FIG. 11 is a comparison of peak signal to generated rms Doppler sidelobe levels for rms phase error of 1 to 5 degrees for a 5 and 6 bit phase shifter.

FIG. 11 is a comparison of peak signal to generated rms Doppler sidelobe levels for rms phase errors of 1 to 5 degrees for a 5 and 6 bit phase shifter. The plot shows that for these two phase shifters the rms sidelobe levels are driven by the phase shifter errors rather than the number of bits. A good quality phase shifter in the early 1990s had 2 degree rms error (M. Skolnik, "Radar Handbook", Second Edition 1990, section 7.9). This yields a peak signal to rms sidelobe level of better than 55 dB.

Figure 12:
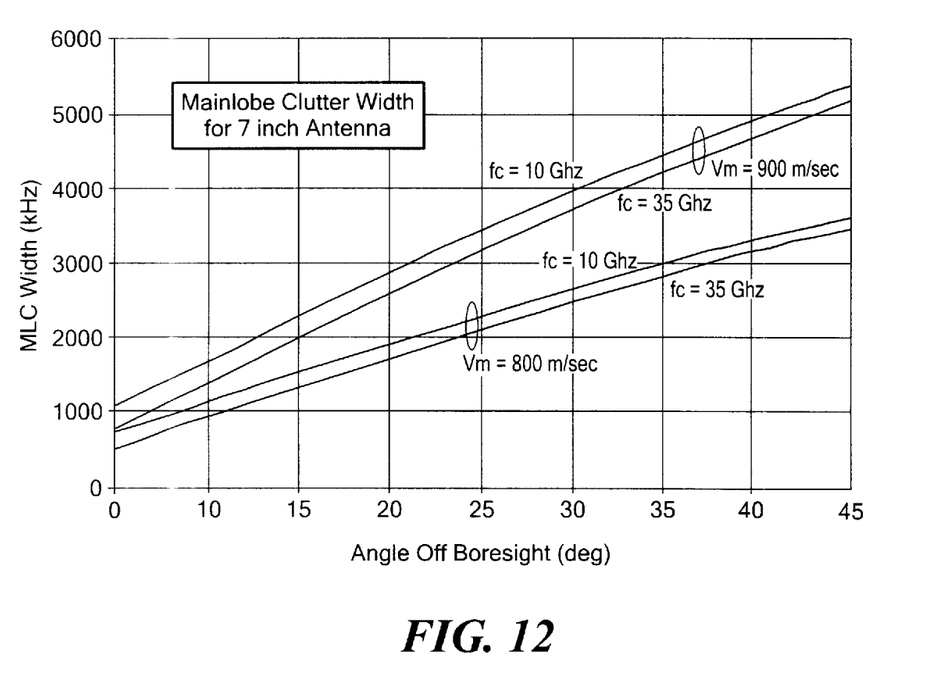
FIG. 12 is a plot of the width of the MLC as a function of look angle for a missile with mach 2 velocity, and missile radar operating at either X or Ka band.

Now considering clutter frequency estimation, the error in MLC frequency estimation can be considered negligible in the implementation of the clutter offset technique. An MPRF system in search mode may have range and Doppler blind zones at each beam position due to waveform ambiguities that can obscure the target return. In order to overcome this limitation, a MPRF system would process at least two acquisition dwells at each beam position using complementary PRFs. A complementary PRF is defined here as a PRF whose range and Doppler blind zones fall in different regions of range/Doppler space as compared to the first PRF. Therefore, the antenna would move at most one half of an antenna beamwidth (two way) for each radar dwell. Since the antenna beamwidth defines the width of the MLC signal and the direction and amount of head motion define the shift in MLC frequency it can be assumed that the MLC frequency change will be no more than one half the width of MLC from radar dwell to radar dwell. Frequency shifts of one half MLC would correspond to head motions radially towards or away from the missile velocity vector. All other head directions would produce MLC shifts of less than one half the MLC width. Therefore, if the frequency and width of MLC is measured, each dwell it can be used without modification as the predicted MLC frequency and width for the next radar dwell. However with the use of inertia measurement units (IMUs) and precision resolvers in the head control electronics the motion of the head with respect to the missile velocity vector can be predicted and compensated. If the error in the prediction of MLC is reduced by a factor of 3 using IMUs and resolvers, the error in the prediction of the MLC can be reduced to less than ⅙ of the width of MLC. FIG. 12 is a plot of the width of MLC as a function of look angle for a mach 2 and 3 missile at either X or Ka Band. FIG. 12 shows that MLC widths of greater than 1 kHz and closer to 2 kHz can be expected for reasonable missile velocities.

Considering now the MLC positioning errors, the combination of errors in estimating MLC frequency coupled with the quantized frequency shift capability of the phase shifter contribute to the error in positioning MLC over feedthrough, The goal from a system point of view is to be able to place MLC to within plus or minus one half the width of MLC around the feedthrough. The MLC frequency estimation error is taken as plus or minus ⅙ of the MLC (qualitatively described above) which leaves a plus or minus ⅓ positioning error due to the phase shifter quantization. In absolute terms the frequency steps must be less than ⅔ the bandwidth of the MLC signal. If we assume the bandwidth of the MLC signal to be about 2 kHz (corresponding to a 35 GHz mach 3 missile and a target look angle of 15 degrees), then the system must be able to position predicted MLC to within 0.67 kHz of feedthrough. This implies a step size of 1.33 kHz. From FIG. 9 it can be seen that a 6 bit phase shifter operating at PRFs up to 70 kHz is sufficient for the task.

Figure 13:
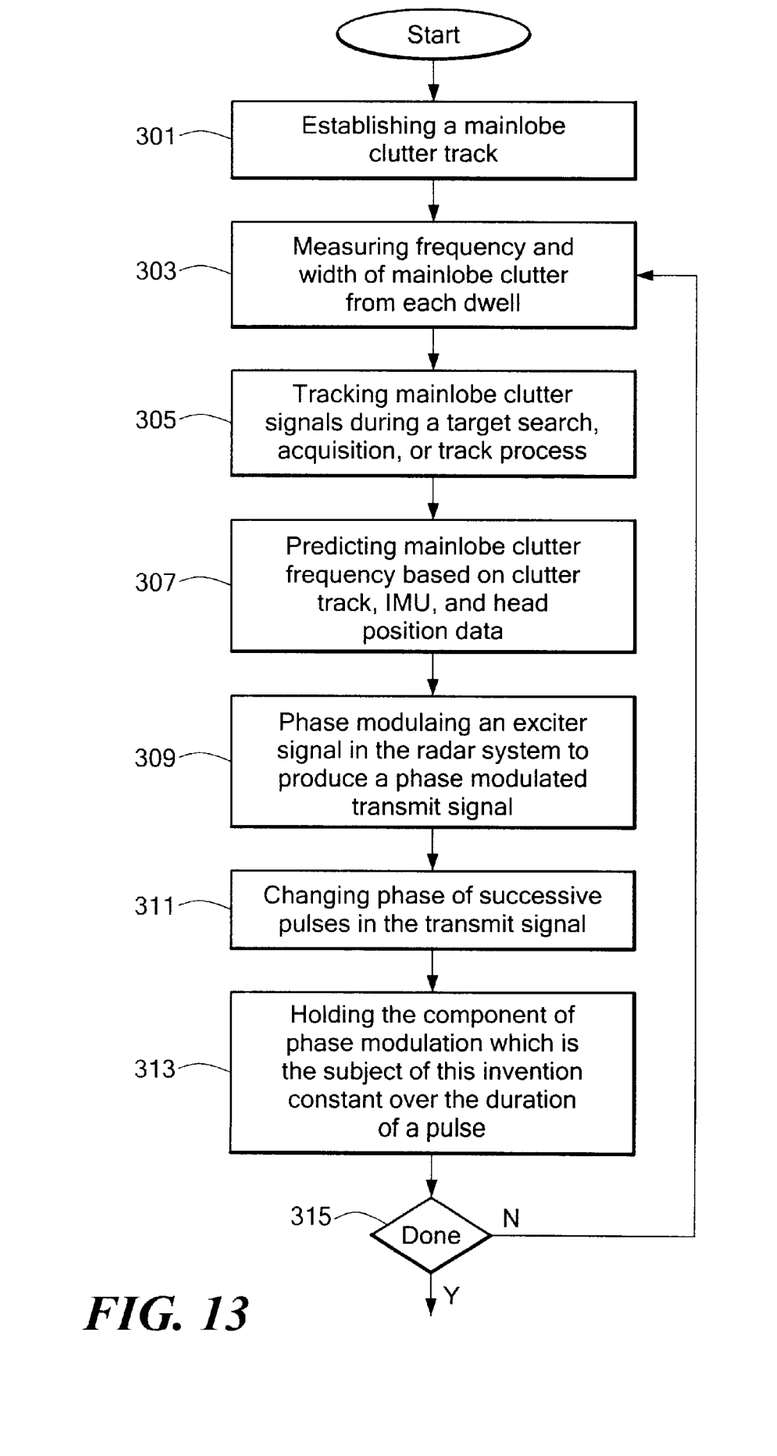
FIG. 13 is a flow diagram showing the steps to implement the invention.

Referring now to FIG. 13, a flow diagram to implement the technique described above using digital signal processor 128 and computer 150 is shown. Since the location of the feedthrough is a function of the radar design, there is no need to measure its position; its location in the final Doppler output of the radar can be predicted apriori and stored in a lookup table. First, a track is established as shown in step 301 on the mainlobe clutter return, followed by measuring each dwell step 303 for the frequency and width of the clutter return. The measurements are used to update the clutter track step 305. Using data from step 305, and using available head position and IMU data, the clutter frequency is predicted from the time of the track update to the current time, step 307. Using this data, a phase modulating an exciter signal in the radar system to phase modulate a transmit signal processing step 309 is performed to control the phase of each pulse of the transmit signal 11. Based on the predicted Doppler frequency of mainlobe clutter, a changing phase of successive pulses in the transmit signal processing step 311 is performed as well as a holding the phase modulation constant over the duration of a pulse processing step 313. If the subroutine is continuing to track mainlobe clutter signals, then the subroutine continues with the tracking mainlobe clutter signals processing steps 303 and 305 and repeats the successive steps. If mainlobe clutter signals diminish then the subroutine will end.

It should now be appreciated that the inventive concept described herein is the realization that the mainlobe clutter and feedthrough interference can be made to overlap in the final doppler output of a coherent pulse doppler radar by placing interpulse modulation on the transmit signal. The selected phase modulation is derived from the linear phase ramp required to shift the mainlobe clutter spectrum into alignment, but held constant over the duration of a pulse. The constant phase shift across each pulse has no effect on the performance of intrapulse compression modulation and results in pulse to pulse phase shifts easily being accomplished with existing phase shifters. The technique takes advantage of the phase run out over the duration of a pulse between the applied modulation and linear phase ramp produced by the Doppler shift of the mainlobe clutter signal. The phase run out is a phase ramp with periodicity exactly matching that of the transmitted waveform with the resultant PM line spectrum aliasing at the waveform PRF thus causing the mainlobe clutter signal to alias into the feedthrough signal.

It should also be appreciated that the invention as described herein has application in any airborne MPRF radar application where there is a strong mainlobe clutter return. Applications include surveillance modes of avionics radars which use MPRF waveforms, terminal active missile seeker acquisition with MPRF waveforms, and MPRF track of low altitude targets by either avionics or missile seeker radars. In all of the above situations, there is potential for a strong mainlobe clutter return. If the final spectral position of this return is not controlled, it adversely impacts the radar's ability to place the target in Doppler clear space free from altitude return, feedthrough, eclipsing, and mainlobe clutter. The described technique causes feedthrough and mainlobe clutter to overlap in the final spectral output of the radar, thus isolating two of the major sources of interference to the same spectral region of the radar's output.

All references made, herein are hereby incorporated by reference in their entirety.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

What is claimed is:

1. A radar system comprising:
   an interpulse phase modulation circuit to phase modulate a transmit signal to cause a returned mainlobe clutter signal to align with a feedthrough signal in a range Doppler output of the radar system wherein the phase modulation circuit comprises one or more digital phase shifters used for impressing phase modulation on an exciter signal in a radar.

2. A radar system comprising:
   an exciter having a phase modulator to phase modulate a transmit signal, the phase modulator responsive to a control signal, wherein the phase modulator shifts the center frequency of each coherent dwell of the transmit signal to bring mainlobe clutter PRF signals into alignment with feedthrough signals; and
   a clutter compensator, responsive to a signal indicative of mainlobe clutter frequency, to provide the control signal to the phase modulator.

3. The radar system as recited in claim 2 wherein the clutter compensator comprises means for determining a required phase modulation or frequency shift to place the mainlobe clutter frequency at a multiple of a pulse repetition frequency.

4. The radar system as recited in claim 3 wherein the means for determining a required phase modulation or frequency shift comprises means for estimating mainlobe clutter frequency from inertial measuring unit and head position data.

5. The radar system as recited in claim 4 wherein the means for determining a required phase modulation or frequency shift comprises means for actively tracking mainlobe clutter during the acquisition process and modifying the clutter frequency estimate accordingly.

6. A method for operating a radar system comprising the step of controlling frequency of mainlobe clutter in a Doppler output of a radar comprising the steps of:
   impressing phase modulation on an exciter signal in a radar using one or more digital phase shifter circuits to phase modulate a transmit signal to cause mainlobe clutter blinds to align with feedthrough blinds in the range Doppler output of the radar; and
   holding the phase modulation constant over the duration of a pulse.

7. A method for operating a radar system comprising the steps of:
   reducing the effects of mainlobe clutter and feedthrough interference in the radar system comprising the steps of overlapping mainlobe clutter frequency and feedthrough interference frequency in a Doppler output of the radar by changing phase of successive pulses of a transmit signal.

8. A method for operating a radar system comprising the steps of:
   (a) estimating mainlobe clutter frequency;
   (b) phase modulating an exciter signal in the radar system using one or more digital phase shifter circuits to phase modulate a transmit signal to cause mainlobe clutter blinds to align with feedthrough blinds in a range Doppler output of the radar.

9. The method as recited in claim 8 wherein the phase modulating step comprises:
   (a) modifying the mainlobe clutter frequency estimate based on IMU and head position data;
   (b) tracking mainlobe clutter signals during a target search, acquisition, or track process; and
   (c) updating the mainlobe clutter frequency estimate based on tracked mainlobe clutter signals.

10. The method as recited in claim 8 wherein the phase modulating step comprises the step of translating a carrier frequency by an amount that will cause the main lobe clutter return signal frequency to be a multiple of a pulse repetition frequency when the feedthrough is isolated to a zero frequency bin of a Doppler processor output.

11. The method as recited in claim 8 wherein the phase modulating step comprises the steps of:
   changing phase of successive pulses in the transmit signal; and
   holding the phase modulation constant over the duration of a pulse.

12. The method as recited in claim 8 wherein the phase modulating step comprises the step of translating the transmit signal x(t) having a carrier frequency fc by a desired frequency shift $f_s$ Hz to a modulated carrier frequency $f_{mod}$ Hz.

13. The method as recited in claim 8 wherein the phase modulating step comprises the step of translating a carrier frequency by an amount that will cause a frequency of a mainlobe clutter return signal to be a multiple of a pulse repetition frequency.

14. The method as recited in claim 8 comprising the steps of measuring frequency and width of clutter returns and updating a clutter track filter, the output of which is combined with IMU and head position data to predict the mainlobe clutter frequency and width for a successive radar dwell.

15. The method as recited in claim 8 comprising the step of compensating for any shift of Doppler frequency of a target.

16. A method for operating a radar system comprising the step of:
   overlapping mainlobe clutter interference and feedthrough interference in a Doppler output signal of a coherent pulse Doppler radar comprising the steps of phase modulating each pulse of a transmit signal wherein the selected phase modulation is derived from a linear phase ramp required to shift the mainlobe clutter interference into alignment with the feedthrough interference and holding the phase modulation constant over the duration of a pulse.

17. The method as recited in claim 16 comprising the step of compensating for any shift of Doppler frequency of a target.

* * * * *